United States Patent
Burkhardt

[15] 3,636,538
[45] Jan. 18, 1972

[54] APPARATUS FOR THE DETERMINATION OF THE POSITION OF TWO PARTS MOVABLE RELATIVE TO EACH OTHER

[72] Inventor: Horst Burkhardt, Stein an der Traun, Germany

[73] Assignee: Dr. Johannes Heidenhain, Traunreut nr. Traunstein, Germany

[22] Filed: Nov. 25, 1968

[21] Appl. No.: 778,538

[30] Foreign Application Priority Data

Nov. 25, 1967 Germany............P 16 23 905.7

[52] U.S. Cl.................................340/206, 340/178
[51] Int. Cl..........................................G08c 19/16
[58] Field of Search...................340/206, 82.5, 203, 204

[56] References Cited

UNITED STATES PATENTS

| | | | |
|---|---|---|---|
| 2,886,717 | 5/1959 | Williamson | 340/206 |
| 2,886,718 | 5/1959 | Shepherd | 340/206 |
| 3,039,032 | 6/1962 | Fowler | 340/198 |
| 3,350,939 | 11/1967 | St. Clair | 340/206 |

*Primary Examiner*—Thomas B. Habecker
*Attorney*—Ernest G. Montague

[57] ABSTRACT

An apparatus for the determination of the position of two parts moveable relative to each other, wherein the value to be measured as to size and direction is determined by impulsive counting, which comprises a correction system in addition to a measuring system for parts moveable relative to each other. The measuring system includes an indication unit and/or a control unit, and the correction system is adapted to feed correction impulses, upon relative movements of the parts, corresponding with the prevailing deviation of the assigned position of the parts to a counter.

2 Claims, 2 Drawing Figures

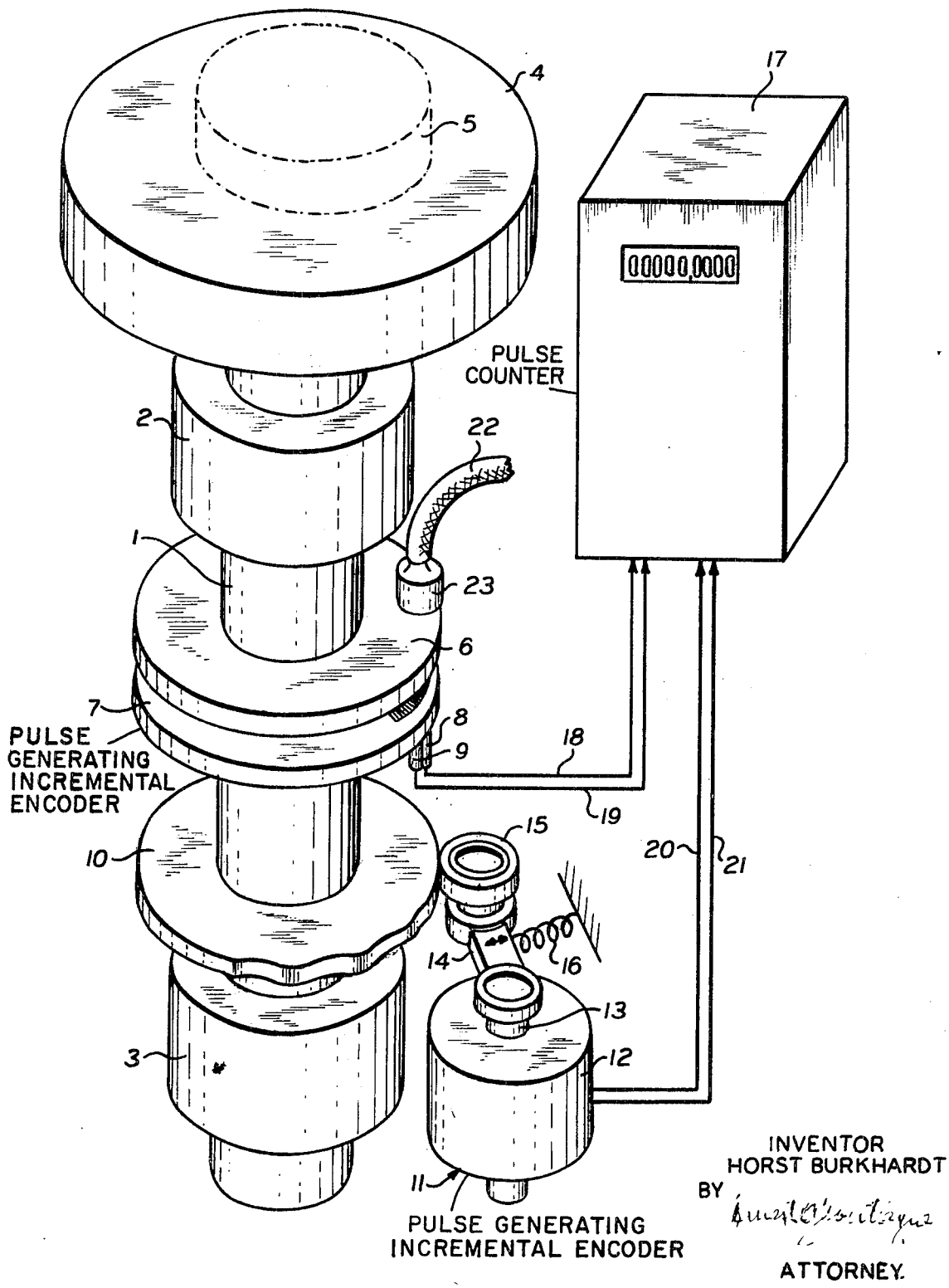

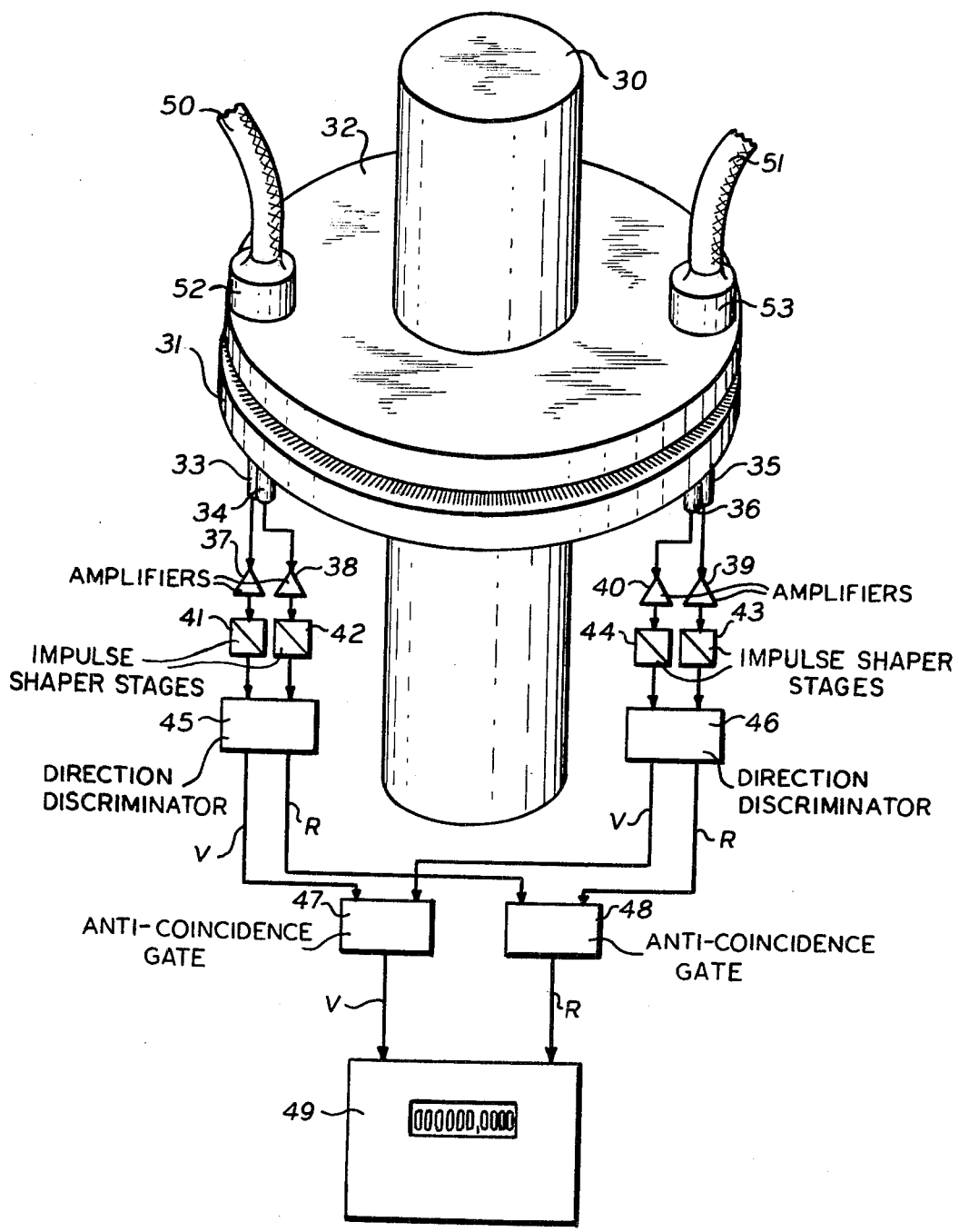

APPARATUS FOR THE DETERMINATION OF THE POSITION OF TWO PARTS MOVABLE RELATIVE TO EACH OTHER

The present invention relates to an apparatus for the determination of the position of two parts movable relative to each other, in general, and in which the value to be measured is determined as to its size and direction by impulse counting.

The parts movable relative to each other can be, for instance, the bed and a slide of a machine longitudinally displaceable on the bed or an immovable housing and a clamping plate of a round table rotatable in the housing or the like.

It is a drawback in known devices of this type that by errors, for instance division errors in scales or graduations and possibly machine errors, the parts movable relative to each other are subjected to deviations from the nominal position.

It is, thus, one object of the present invention to provide an apparatus for the determination of the position of two parts movable relative to each other, in which the shown drawbacks are avoided without rendering the apparatus cumbersome.

It is another object of the present invention to provide an apparatus for the determination of the position of two parts movable relative to each other, wherein in addition to the measuring system for the parts movable relative to each other, also a correction system is provided, which, in case of relative movements of the mentioned parts, feeds correction impulses an indication and/or control unit of the measuring system corresponding to the nominal position of the parts to the counting.

The correction system provided on the parts movable relative to each other, analogous to the measuring system, contains a correction curve, which is arranged corresponding with the deviations from the nominal position of the mentioned parts, and furthermore, are sensed by a pickup, the correction impulses emitted therefrom are fed to the indication and/or control unit of the measuring system.

The correction curve can be designed, for instance, as a mechanical gauge or as a flexible band, suitably a steel band, which is secured at predetermined distances on adjustably mounted carriers and is sensed directly from the pickup of the correction system.

Beyond that, in accordance with a further embodiment of the present invention, it also possible to mount the correction curve on a carrier-body, for instance, as a line marker, whereby as a carrier for these line markings also a body of the measuring system equipped with division can be applied for the parts movable relative to each other. In the latter case, suitably the line marker forming the correction curve is sensed without engagement by a pickup of any selected known type, the output signals of which are emitted simultaneously as impulses to the parts movable relative to each other for the determination of the position.

A structurally simple arrangement results if, for instance, the pickup of the correction system contains a rotary impulse transmitter, the rotary axis of which is rigidly connected with a lever, which senses with equalized pressure the correction curve, for instance, of a mechanical gage and the emitted correction impulses of the latter are fed to the measuring system, in the electronic indication unit of which the correction impulses are added or subtracted to and from, respectively, the measuring result, corresponding to the information content.

By the arrangement in accordance with the present invention of the correction system, it is rendered possible, to return the electronic indication unit of the measuring system in any selected position of the parts movable relative to each other again to the value zero, without interfering with the function capability of the correction system.

The measuring system provided for the determination of the relative position of the parts movable relative to each other and the measuring apparatus of the correction system emitting likewise impulses, can, for instance, be photoelectric grid-sensing devices of any selected known structure, the amplified output impulses of which feed impulse-shaping stages and in further consequence to directional discriminator circuits provided in the electronic indication unit and, thereafter, to a counter circuit, which counter circuit transforms the impulses corresponding to their information content to length indications.

In order to prevent that impulses of the measuring system and impulses of the pickup of the correction system arrive simultaneously in the mentioned electronic indication unit, suitably so-called anticoincidence gates are provided in the electronic indication unit, the aim of which resides in the fact that simultaneously arriving impulses of the measuring system and of the correction system are stored separately and thereafter timely in succession are freed for counting. A control device of a known type can be coordinated to the mentioned electronic indication unit of the measuring system, which control device influences the position relation of the parts movable relative to each other as long, until the actual position corresponds with the desired nominal position of the mentioned parts.

In view of the exactness and design simpler as to its technical manufacture in accordance with the present invention, it has been found suitable to design the correction curve such, that the individual points thereof have a distance from an ideal relation-curve or -face, which is proportionally enlarged to the distance of the corresponding points of the actual curve of the divisional error path and/or the actual movement path from the mentioned ideal relation-curve or -face.

With these and other objects in view, which will become apparent in the following detailed description, the present invention, which is shown by example only, will be clearly understood in connection with the accompanying drawings, in which:

FIG. 1 is one embodiment of the apparatus designed in accordance with the present invention, in which the division error of a circle division is compensated by the correction device; and FIG. 2 is an embodiment of the apparatus designed in accordance with the present invention, in which the eccentricity error of a circular division is compensated by the correction device.

Referring now to the drawings, and in particular to FIG. 1, the apparatus designed in accordance with the present invention comprises an axle 1 of a round table, which axle 1 is rotatable in bearings 2 and 3. A clamping plate 4 is rigidly connected with the axle 1, on which clamping plate 4 a test or workpiece 5 is secured by means of clamping members (not shown). A disc 6 likewise rigidly connected with the axle 1, which disc 6 is used for measuring and setting of angles. The disc 6 is designed as a radial grid, whereby the grid arrangement is made such that each path element consists of a transparent and a nontransparent part field. The division of an immovable sensing disc 7 is designed such, that it is identical with that of the disc 6. Yet, for the allowance of the direction of movement of the axle 1 on the sensing disc 7, two divisions set off relative to each other and identical with the division of the disc 6 are provided. The discs 6 and 7 constitute a first pulse-generating incremental encoder. By the division displacement on the sensing disc 7, the electrical signals emitted from the photoelectric structural elements 8 and 9 are displaced in their phase for 90°. The output signals of the photoelectric structural elements 8 and 9 are fed by means of electrical conduit 18 and 19 to amplifiers and impulse-sharing stages as well as to a direction discriminator- and counting-circuit provided in the electronic indication unit 17, which elements transform the impulses in correspondence with their information content into length indications.

The discs 6 and 7 equipped with the division are lit up by means of a lamp (not shown) over a flexible light cable 22 and a condenser 23. The light bundle passes the grid division of the discs 6 and 7 and is concentrated in conventional manner by means of objectives (not shown) onto the light penetration face of the photoelectric structural elements 8 and 9.

In accordance with the present invention, a correction curve (cam means) 10 is provided on the axle 1 of the round table, which correction curve 10 is formed by example corresponding to the inner division errors of the radial grids. The correction curve 10 is sensed thereby by a receiver 11. The receiver 11 of the correction system comprises a rotary impulse generator 12 of any known conventional structure and constituting a second pulse generating incremental encoder secured to a housing (not shown) of the round table. On the axle 13 of the rotary impulse generator 12 is secured a lever 14, which senses by means of an easily rotatably mounted roller 15 the correction curve 10. A spring 16 causes that the roller 15 of the receiver 11 engages always the correction curve 10.

The electrical output signals of the rotary impulse generator 12 are fed by means of electrical conduits 20 and 21 to a direction discriminator- and counting-circuit provided in the electrical indication unit or counter 17. In the electronic indication unit 17, the impulses emitted from the correction system are either added to or subtracted from, in accordance with its information content, the impulses obtained from the measuring device 6 and 7.

In order to avoid that impulses of the measuring system 6, 7 and impulses of the correction system 10, 11 enter simultaneously in the mentioned electronic indication unit 17, suitably in the electronic indication unit 17, so-called anticoincidence gates are provided, the task of which resided in the fact that simultaneously arriving impulses of the measuring system 6, 7 and of the correction system 10, 11 are stored separately and thereafter are freed timely in succession for counting.

The present invention is, of course, not limited to the shown embodiment, rather it is also possible to apply the correction system in machines and devices or the like with straight displaceable parts. In this case it is merely necessary to replace the disc-shaped correction gage 10 by a correction ruler, while the receiver for the correction can be the same as in the above-shown embodiment.

With the correction system of the present invention, in addition to division errors of the measuring scale, by example also guide errors of the parts movable relative to each other can be rendered ineffective. The correction profile is thereby suitably formed by a flexible metal band which is secured to adjustable carriers, so that the correction profile can be selectively varied at any time by adjustment of the carrier. Guide errors which occur only during the operating period or which vary as to their size during a time period, can be balanced out in this manner.

Also, the invention is not limited to the feature that the measuring system for the determination of the relative position of two parts, as well as the measuring system of the correction device are photoelectric grid-sensing devices, rather it is, as a matter of course, also possible to replace the photoelectric measuring system by known capacitive, inductive and magnetic measuring systems or the like.

Referring now again to the drawings, and in particular to FIG. 2, a further embodiment of the present invention is disclosed in which the eccentricity error of a circle division is compensated by a correction system.

The axle 30, for instance, of a round table, is rotatable in bearings (not shown). Rigidly connected with the axle 30 is a disc 31, which is formed as a radial grid. The grid arrangement is arranged such, that each path element consists each of a transparent and a nontransparent division field or part field. The division of an immovable sensing disc 32 is designed such, that it is identical with the division of the disc 31. For the recognition of the direction of movement of the axle 30, however, on the side of the sensing disc 32 pointing towards the division of the disc 31 two oppositely displaced division traces are provided.

Photoelectronic structural elements 33, 34, 35 and 36 are coordinated to the discs 31 and 32. The output signals of the photoelectronic structural elements 33, 34 and 35, 36 are fed by means of electrical conduits to amplifiers 37, 38 and 39, 40 to impulse shaper stages 41, 42 and 43, 44, as well as direction discriminators 45, 46.

In order to avoid that output impulses of the direction discriminators 45 and 46 arrive simultaneously in the electrical indication unit 49, known anticoincidence gates are provided. It is the task of the anticoincidence gates 47 or 48, to store separately simultaneously arriving forward impulses V or rearward impulses R of the direction discriminators 45 and 46 and to free the same timely successively for the counting.

In the electronic indication unit 49, the forward impulses V and the rearward impulses R, respectively, emitted from the anticoincidence gates 47 and 48, respectively, are summed up. The sensing grids of the disc 32 are arranged such that, in case of a predetermined direction of rotation of the axle 30, forward impulses V are released to the anticoincidence gate 47 from both measuring systems 33, 34 and 35, 36. In case of opposite direction of rotation of the axle 30 always rearward impulses R are released to the anticoincidence gates 48, from the mentioned measuring system 33, 34 and 35, 36. The actual measuring value can be determined in the shown embodiment by example by calculation by cutting in half the value indicated on the counter 49. Conversions can be avoided, in case it is desired, either by taking the double of the grid constant of the division of the disc 31, 32 or by using an electronic counting device suitable therefor, in which only each second incoming impulse contributes to the control of the counter.

The division of the discs 31, 32 is lit by a lamp (not shown), for instance, by means of a flexible light cable 50 and 51, as well as condensers 52 and 53. The light bundles pass the grid division of the discs 31 and 32 and are concentrated by means of objectives (not shown) to the light entrance face of the photoelectronic structural elements 33, 34 and 35, 36.

While I have disclosed several embodiments of the present invention, it is to be understood that these embodiments are given by example only and not in a limiting sense.

I claim:

1. An apparatus for the determination of the position of two parts movable relative to each other, wherein the value to be measured as to size and direction is determined by impulse counting, comprising:

a position measuring means for parts movable relative to each other, a correction means in addition to said measuring means for said parts movable relative to each other, said position measuring means including a first pulse-generating incremental encoder and a counter indicator means counter, a second pulse-generating incremental encoder, said correction means including a correction cam means operatively coupling movement of the movable part to said second pulse-generating incremental encoder.

2. The apparatus, as set forth in claim 1, further comprising:

a cam follower of said correction cam means operatively coupled to said second pulse-generating incremental encoder, and said correction cam means is formed as a mechanical cam which is sensed by said cam follower of said correction means.

* * * * *